June 20, 1967 R. D. REED 3,326,041
APPARATUS FOR DEVELOPING DIFFERENTIAL
PRESSURES IN A CONDUIT LINE
Filed April 14, 1965
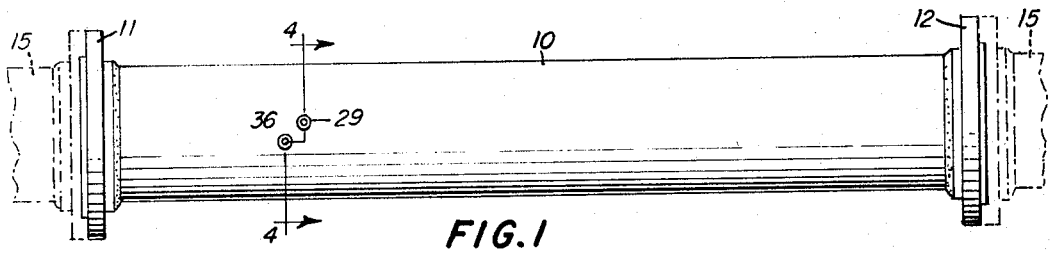
FIG. 1
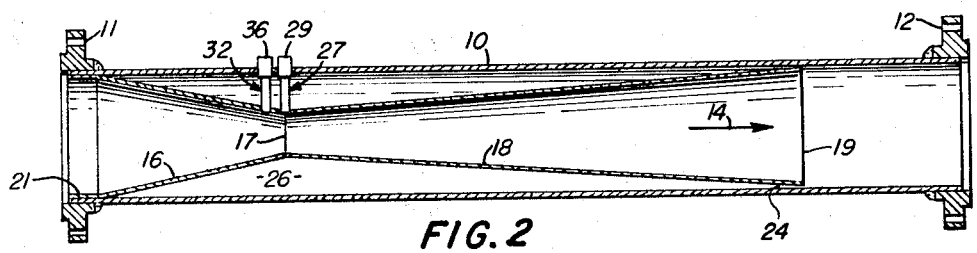
FIG. 2
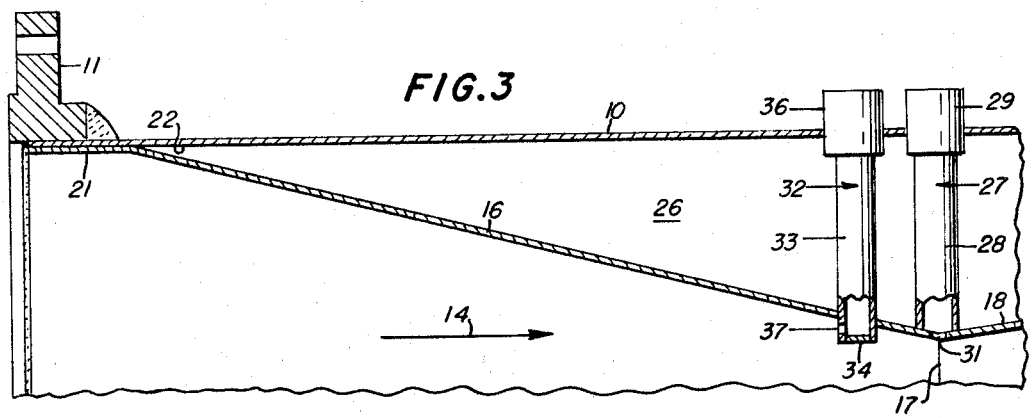
FIG. 3
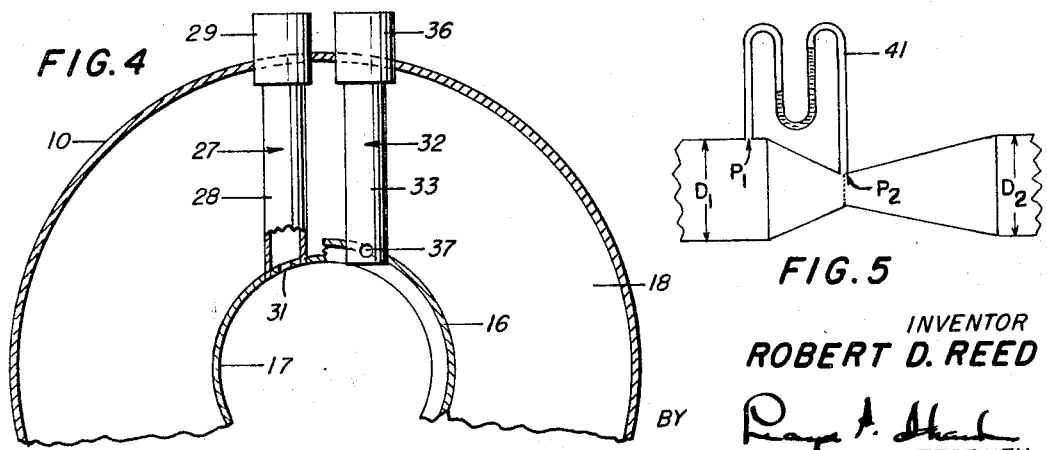
FIG. 4
FIG. 5
INVENTOR
ROBERT D. REED
BY
ATTORNEY

United States Patent Office 3,326,041
Patented June 20, 1967

3,326,041
APPARATUS FOR DEVELOPING DIFFERENTIAL PRESSURES IN A CONDUIT LINE
Robert D. Reed, Tulsa, Okla., assignor to John Zink Company, Tulsa, Okla., a corporation of Delaware
Filed Apr. 14, 1965, Ser. No. 448,005
2 Claims. (Cl. 73—213)

The present invention relates to apparatus for developing differential pressures within a conduit line by providing means therein forming a contraction or "throat" which serves to create such pressure differences for indicating the rate of flow or to operate controls which govern to flow of fluid in the conduit line.

A Venturi meter has been employed to measure the flow of fluids with a minimum of pressure drop across the measuring device and represents a desired arrangement for sensing the flow of a fluid through a conduit and it avoids the costs of generating additional pressure in the line to compensate for a loss in pressure. When a Venturi meter is formed with minimum tolerances its efficiency is in the range of ninety-five to ninety-nine percent. If the variations in dimensions in manufacture vary beyond such tolerances the accuracy and efficiency of the device is adversely affected and the pressure loss in a conduit line is more pronounced. It is possible to fabricate structure providing the oppositely tapered portions with the "throat" therebetween at reasonable costs when the diameter of the tubular device is four inches or less. The formation of such structure for devices having larger diameters involve costs which are prohibitive and the cost increases with the diameter of the device.

It is an object of the present invention to provide apparatus for developing differential pressures in a conduit line wherein the tapered sections and the "throat" are fashioned from light gauge sheet material so arranged in a pipe section which forms a part of the conduit line as to provide a Venturi meter within a conduit line of any diameter at acceptable costs and provide apparatus which will handle desired pressures without distorting the sheet material.

Another object of the invention is to provide apparatus for developing a greater difference in pressures as a consequence of the energy conversion that takes place through the "throat" of a conventional Venturi meter to thereby render the flow sensing assembly capable of indicating flow velocities as low as one and one-half feet per second.

Other objects and features of the invention will be appreciated and become apparent particularly to those skilled in the art to which the invention pertains as the present disclosure proceeds and upon consideration of the following detailed description taken in conjunction with with the annexed drawing wherein an embodiment of the invention is disclosed.

In the drawing:

FIG. 1 is a side elevational view of a section of a conduit line in which the invention is embodied.

FIG. 2 is an axial sectional view of the pipe section shown in FIG. 1 and illustrating the structure for creating pressure differences.

FIG. 3 illustrates the elements shown at the left in FIG. 2 and on a larger scale.

FIG. 4 is an enlarged transverse sectional view taken on the line 4—4 of FIG. 1.

FIG. 5 is a diagrammatic view illustrating a conventional Venturi meter.

The invention is directed to an assembly within a pipe which may form a part of a conduit line carrying a fluid in which the rate of flow is to be determined. The pipe section 10 may be formed in a conventional manner of rugged characteristics suitable for handling the pressures under which the fluid is moved along the conduit line. The pipe section 10 may be of any suitable size and may have a diameter larger than four inches. It may be equipped at the ends with flanges 11 and 12 for connection to other pipe sections of the conduit line 15. The direction of flow is from left to right in the drawing and in the direction of the arrow 14 shown in FIG. 2.

In carrying out the invention the oppositely tapered portions and the "throat" of the structure which develops the pressure differences as a consequence of the fluid flowing therethrough are formed of sheet material such as light gauge metal. Such an assembly avoids machining and other manufacturing costs in forming such portions integral with the wall of the pipe 10. The structure within the pipe section 10 includes a first frusto-conical tapered portion or element 16 which converges in proceeding in the direction of flow to the "throat" 17. Thereafter the tubular structure includes a second frusto-conical shaped portion or element 18 which divergently tapers in proceeding in the direction of flow from the "throat" 17. The tapered portion 18 has a diameter at the downstream end 19 thereof slightly less than that of the interior of the pipe section 10. The downstream end portion 19 is not attached to the pipe 10 and an annular passage 24 is provided between the exterior of the element 18 and the interior of the pipe 10. The upstream end portion 21 of the sheet material forming energy conversion system is secured to the pipe 10 as best shown in FIG. 3.

The annular space 24 provided between the exterior of the end portion 19 and the interior surface 22 of the pipe 10 permits fluid under pressure to enter the annular area 26 formed between the exterior of the sheet material assembly and the pipe 10. Thus the relatively thin walls of the energy conversion assembly are not flexed or distorted during use of the device because no significant pressure difference can exist between the exterior and interior of the sheet material assembly. The fabrication of the portions 16 and 18 of sheet metal simplifies the manufacture with tolerances which provide an efficiency close to one hundred percent and at a fraction of the cost that would be required in machining the conical inner surfaces on the interior of a large pipe. The absence of attachment on the end portion 19 to the pipe 10 also provides an arrangement wherein any difference in the coefficient of expansion of the energy conversion assembly with respect to the pipe may be accommodated without developing undesired stresses in the sheet structure.

A first pressure probe 27 formed in part by a tube 28 may be welded to the exterior of the sheet assembly and extends through an opening in the wall of the pipe 10. The tube 28 may be equipped with a nipple 29 at its outer end. A small port 31 is provided through the sheet material at the "throat" 17 as shown in FIGS. 3 and 4 within the confines of the tube 28. A second pressure probe 32 of similar construction includes a tube 33 which extends through an opening in the wall of the tapered portion 16. The inner end of the tube 33 is closed as shown at 34 (FIG. 3). The tube 33 projects at a minimum distance into the constricted portion of the assembly and not inwardly beyond the diameter of the "throat." The tube 33 may be welded to the tapered portion 16 and extends through an opening in the wall of the pipe 10. A nipple 36 may be provided at the outer end of the pipe 33. The nipples 29 and 36 are sealed with respect to the wall of the pipe 10. It will be observed from a consideration of FIG. 3 that the second pressure probe 32 is positioned upstream of the first pressure probe 27. These two probes are also circumferentially spaced from each other as best shown in FIG. 4. A small impact port 37 is provided in the tube 33 and faces upstream of the assembly and in a direction opposite to the flow indicated by the arrow 14. On one embodiment the diameter of the impact port 37 is approximately one-half of the diameter of the port 31.

In a conventional Venturi meter as shown in FIG. 5 the diameters at D1 and D2 are identical. The pressure at P1 is the static pressure. The pressure P2 is less than the pressure P1 when there is a flow of fluid through the contraction because there is acceleration of flow and as a consequence of the velocity at the "throat" where the pressure P2 is taken. These pressures taken at points laterally to the flow axis and at the periphery of the flow area show the difference in the pressure head and velocity head as indicated with the shaded portion of the manometer 41. If the open end of a pitot tube was pointed in the upstream direction at the axis of the area of the pressure P2 the fluid would impact on the open end of the pitot tube. In such an event the velocity head would be added to the static head to produce a pressure greater than the static head. Such an arrangement of a pitot tube would be helpful in showing a greater pressure difference when the flow in the conduit line is at extremely low value.

The present invention avoids pressure loss created by such a pitot tube arrangement and the pressure probe 27 serves to communicate the pressure at the point of maximum acceleration. The pressure probe 32 is located as close as possible to the point of maximum acceleration and it samples the total pressure through the impact port 37. The pressure probes 27 and 32 sample differential pressures where the pressure differences are the greatest or the smallest according to the velocity of flow past the ports 31 and 37. The difference in pressures due to the varying flow serves to sense flow or provide a basis for indicating or measuring the rate of flow and suitable connections made to the nipples 29 and 36 serve to operate controls which in turn may function to govern the flow through the conduit line. While a conventional Venturi meter is to a limited extent capable of such functions the differential pressures generated by flow velocities in a conventional energy conversion system provide relatively small fraction of the differential pressure that are realized through the use of the structure hereinabove described and which is suitable for use when the fluid has velocities less than ten feet per second. In the chemical and refining industries the flow velocities in the conduit line are often as low as one-half foot per second and such flow characteristics require sensitivity more than six times greater than that which is possible with conventional Venturi meter.

While the invention has been described with reference to structural characteristics and with materials of one type it will be appreciated that changes may be made in the components as well as the overall assembly. Such modifications and others may be made without departing from the spirit and scope of the invention as set forth in the appended claims.

What I claim and desire to secure by Letters Patent is:
1. Apparatus for developing differential pressures as a consequence of movement of fluid in a confined path comprising, a substantially rigid pipe having a generally cylindrical inner surface, a first frusto-conical element formed of sheet material within said pipe having its larger end secured to said pipe and sealed with respect to the inner surface thereof, said first frusto-conical element converging in proceeding downstream within the pipe, a second frusto-conical element formed of sheet material with its small diameter end equalling and joining the small diameter end of the first frusto-conical element with said small diameter ends providing a throat, said second frusto-conical element having a substantially true frusto-conical inner surface diverging in proceeding downstream from said throat substantially to the inner surface of said pipe, said frusto-conical elements and the throat therebetween providing sheet material energy conversion assembly, intermediate exterior surfaces of both of said frusto-conical elements spaced from said pipe providing an annular area between the exterior of the frusto-conical elements and the interior of the pipe, the diameter of the downstream end of said second frusto-conical being less than the inner surface of said pipe providing an annular passage for communication between said annular area and the interior of the pipe, the downstream end of said second frusto-conical element being unattached to said pipe allowing axial expansion and contraction of sheet material energy conversion assembly lengthwise with respect to the pipe, said sheet material energy conversion assembly having a port through the sheet material at the throat for sensing low pressure, a tube extending through the first frusto-conical element upstream of said throat adjacent thereto, said tube having an impact port therein inside the first frusto-conical element facing upstream of the assembly for sampling the sum of the static pressure head at approach to the throat plus the velocity head resulting from acceleration at the approach to the throat, and the inner end of said tube being positioned outside the diameter of said throat.

2. Apparatus for developing differential pressures as a consequence of movement of fluid in a confined path according to claim 1, wherein the tube is offset circumferentially of the assembly from the first port.

References Cited

UNITED STATES PATENTS

| | | | |
|---|---|---|---|
| 1,249,601 | 12/1917 | De Ferranti | 73—213 |
| 2,042,933 | 6/1936 | Forward. | |
| 2,284,013 | 5/1942 | Pardue | 73—213 |

FOREIGN PATENTS

| | | |
|---|---|---|
| 5,450 | 8/1913 | Great Britain. |
| 1,042,073 | 6/1953 | France. |

RICHARD C. QUEISSER, *Primary Examiner.*

E. D. GILHOOLY, *Assistant Examiner.*